(12) United States Patent
Pausch et al.

(10) Patent No.: US 7,413,235 B2
(45) Date of Patent: Aug. 19, 2008

(54) LOAD-CONTROLLED ACTUATING ARRANGEMENT

(75) Inventors: Roman Pausch, Selb (DE); Tobias Wagner, Hamburg (DE)

(73) Assignee: Rausch & Pausch GmbH, Selb (DE)

( * ) Notice: Subject to any disclaimer, the term of this patent is extended or adjusted under 35 U.S.C. 154(b) by 50 days.

(21) Appl. No.: 11/643,082

(22) Filed: Dec. 21, 2006

(65) Prior Publication Data

US 2007/0145765 A1 Jun. 28, 2007

(51) Int. Cl.
*B60J 10/10* (2006.01)
(52) U.S. Cl. .................. 296/107.01; 296/117
(58) Field of Classification Search ........... 296/107.01, 296/117, 108, 107.08, 107.09, 121
See application file for complete search history.

(56) References Cited

U.S. PATENT DOCUMENTS

| | | | | |
|---|---|---|---|---|
| 2,895,764 A * | 7/1959 | Himka et al. | ................ | 296/117 |
| 4,749,193 A * | 6/1988 | Hacker | .................. | 296/107.01 |
| 5,225,747 A * | 7/1993 | Helms et al. | ........... | 296/107.08 |
| 5,335,926 A * | 8/1994 | Stolle | ......................... | 296/117 |
| 5,451,849 A * | 9/1995 | Porter et al. | ................ | 296/117 |
| 5,666,873 A * | 9/1997 | Lindmayer et al. | .......... | 296/117 |
| 5,724,878 A * | 3/1998 | Stolle et al. | .................. | 296/117 |
| 5,764,008 A | 6/1998 | Hahn et al. | | |
| 5,825,147 A * | 10/1998 | Porter et al. | ................ | 296/117 |
| 6,114,819 A * | 9/2000 | Porter et al. | ................ | 296/117 |
| 6,149,221 A * | 11/2000 | Mentink | ..................... | 296/117 |
| 6,273,492 B1 * | 8/2001 | Schroder et al. | ....... | 296/107.01 |
| 6,454,344 B2 * | 9/2002 | Okada et al. | ................. | 296/121 |
| 6,726,269 B1 * | 4/2004 | Frank | ......................... | 296/117 |
| 6,832,806 B2 * | 12/2004 | Mentink et al. | ............. | 296/115 |
| 7,204,083 B2 * | 4/2007 | Mentink et al. | ............. | 296/117 |
| 2006/0006701 A1 * | 1/2006 | Wells | ......................... | 296/223 |

FOREIGN PATENT DOCUMENTS

| | | |
|---|---|---|
| AT | 402 280 | 3/1997 |
| DE | 195 07 541 | 2/1996 |
| DE | 197 52 535 | 6/1999 |
| DE | 100 48 602 | 4/2002 |

* cited by examiner

*Primary Examiner*—Kiran B. Patel
(74) *Attorney, Agent, or Firm*—Jordan and Hamburg LLP

(57) ABSTRACT

A load-controlled actuating arrangement utilizes a control loop that includes at least one position measuring system, a control unit and at least one measuring system of an electric motor or at least one pressure sensor of a pressure circuit. The signals of the measuring system of the electric motor or of the pressure sensor are transmittable to the control unit and the motion of the convertible top is adjustable by the control unit.

4 Claims, 2 Drawing Sheets

LOAD-CONTROLLED ACTUATING ARRANGEMENT

BACKGROUND OF THE INVENTION

The invention relates to a load-controlled hydraulic actuating arrangement, particularly for a convertible top, according to the species of the claims.

The convertible tops of today are equipped with drive systems that allow a fully automated actuation. For this purpose, motors are arranged for the different single motions of the top in the kinematic system and are controlled via an electronic circuit. This solution has the disadvantage that the load of the motors during the motions cannot be recorded and the motor output cannot be adjusted. The positions of the individual components are sampled for the exact control of the motion sequence via limit switches, and thus a mere sequential run of the motions is generated.

The motion speed of the convertible top can vary in the operating mode due to exterior conditions such as wind from the front or rear side, relative wind or the inclined position of a car to which the convertible top belongs. Undesired approaching speeds of the top parts, e.g. towards the latching units, are the consequence, or it may be necessary to avoid the actuation of the top if the driving speed is too fast. If the top parts collide with objects that are located in the motional path, the resulting increase of the motor output is not identified, resulting in damage to the system.

The patent publication AT 402 280 B describes a hydraulic actuating arrangement for a convertible top with a number of working cylinders that are connected to a common pressure circuit via separate control elements, a control unit that is connected with the control elements and at least one feedback unit that is also connected with the control unit and is used to control the final position of the working cylinders. The feedback unit is provided with at least one pressure sensor in the pressure circuit, and its output signal as a function of time is used together with the defined switching sequences of the single control elements for the final position control of the individual working cylinders.

A system provided with a measuring equipment designed as a rotary potentiometer is described in U.S. Pat. No. 5,225,747. This system can realize the motions not only sequentially, but coherently as a function of a particular motional behavior.

The disadvantage of these two solutions is the fact that the load of the motors during the motion cannot be registered, and therefore, it is not possible to adjust the motor output.

SUMMARY OF THE INVENTION

Thus, it is the object of this invention to provide a load-controlled actuating arrangement for a convertible top that avoids the aforementioned disadvantages of the current state of the art.

According to this invention, this task is fulfilled by an actuating arrangement including at least one position measuring system, a control unit, and at least one measuring system of an electric motor or at least one pressure sensor of a pressure circuit, signals of the measuring system of the electric motor or the pressure sensor being transmittable to the control unit, the motion of the convertible top being adjustable by the control unit. The at least one position measuring system, the control unit and the at least one measuring system of the electric motor or the at least one pressure sensor define, at least in part, a control loop.

The characteristic feature of the invention is the integration of a control loop for the load-controlled actuating arrangement of a convertible top that adjusts the motor output depending on the load of the drive so that regardless of the exterior conditions, the same motion sequence is always ensured and sudden increasing outputs, e.g. in the case of a collision, can be simultaneously registered to interrupt or reverse the motion of the convertible top.

This control can be designed in such a way that the control unit of a convertible top that is operated by electric motors registers the current consumption and the working speed of the motors and corrects the output of the motors as long as the defined speed for the motion of the top is maintained. This can be done in a variable manner during the motion sequence by using a position measuring system to register the corresponding motions of the actuators that are connected with the convertible top or the convertible top cover.

For this purpose, the inventive actuating arrangement is equipped with at least one electric motor with a measuring system that reports the current consumption and/or speed of the motor to the control unit during the motion sequence, and this unit compares the actual value with the desired curve depending on the top position that is recorded by a position measuring system and reported to the control unit. If these actual values deviate from the desired ones, the current consumption and/or the speed of the motor will be adjusted.

An alternative adjustment can be realized by including a pressure sensor in the hydraulic system of a fully automated convertible top. Said pressure sensor reports the operating pressure of the system to the control unit during the motion sequence and the control unit compares the actual value with a desired curve depending on the position of the top that is reported by at least one position measuring system to the control unit. If these actual values deviate from the desired ones, the power of the pressure pump will be adjusted or the flow of the working medium into the actuators (working cylinder with piston rod) will be adjusted by control elements such as proportional valves.

For this purpose, the inventive hydraulic actuating arrangement is provided with at least one pressure sensor in the pressure circuit and with at least one position measuring system at the actuators. The pressure circuit comprises a number of separate control elements with the appropriate actuators. The pressure sensor and the position measuring system are connected with the control unit that controls the setting of the control elements, such a proportional valves, in the pressure circuit and/or the speed of the pressure pump. In this way, a control loop is established that adjusts the motor output according to the load of the drive so that the same motion speed of the convertible top is always ensured regardless of changed exterior conditions.

The advantage of the two control solutions is the fact that the actuating arrangement registers a sudden increase of the load as a deviation of the actual state from the desired state, for example as a collision, and the motion of the actuating arrangement is interrupted or reversed.

In the following, the invention is explained in more detail by means of schematic drawings.

DETAILED DESCRIPTION OF THE INVENTION

Figure 1:
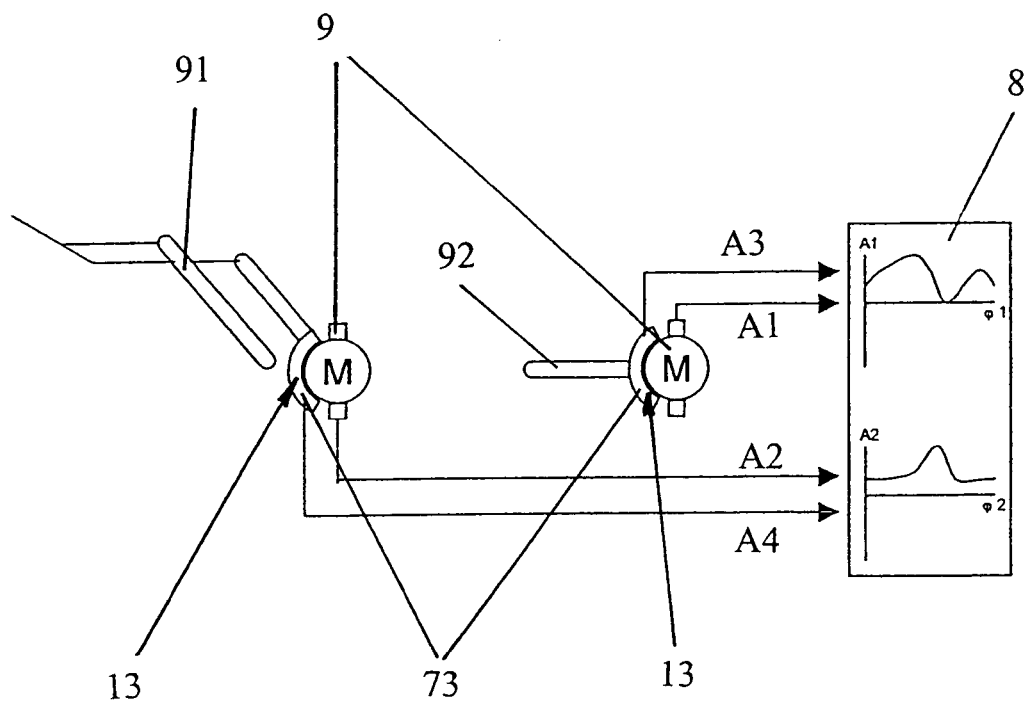
FIG. 1 is a schematic view of a first embodiment of the inventive load-controlled actuating arrangement.

The actuating arrangement shown in FIG. 1 includes two electric motors 9 provided with measuring systems (not separately demonstrated in FIG. 1) that report the current consumption and/or speed of each of the motors 9 to a control unit 8 during the motion sequence. The control unit compares this actual value with a desired curve depending on the position of the top that is reported by at least one position measuring system 13 to the control unit 8. If the actual values deviate from the desired ones, the current consumption and/or the speed of the electric motors 9 (that move the convertible top kinematic system 91 or the convertible top cover 92) will be adjusted. In this arrangement, the position measuring system 13 is an angle measuring system 73.

An electric motor 9 can be used, for example, for the motion of a convertible top and the second electric motor 9 can be used, for example, for the motion of a convertible top cover (both motions not being herein demonstrated).

The measuring systems (current consumption and/or speed registration) of the electric motors 9 are connected with an external control unit 8 via terminals A1 and A2.

Terminals A3 and A4 also transmit the two signals of the position measuring systems 13 to the control unit 8.

The control unit 8 includes a computer (not shown in FIG. 1) for monitoring and analyzing the individual current consumption and/or the speed and the corresponding position of the convertible top. Said computer controls the electric motor 9 thereof. The signal of the measuring system of the electric motor 9 as a function of time is matched with the signals of the position measuring system 13 and is used to control the individual position and the load of the convertible top.

The actual values are matched by using the above mentioned desired curve which is stored in the computer. If the actual values deviate from the desired curve, the output of the electric motor 9 will be adjusted/controlled.

Figure 2:
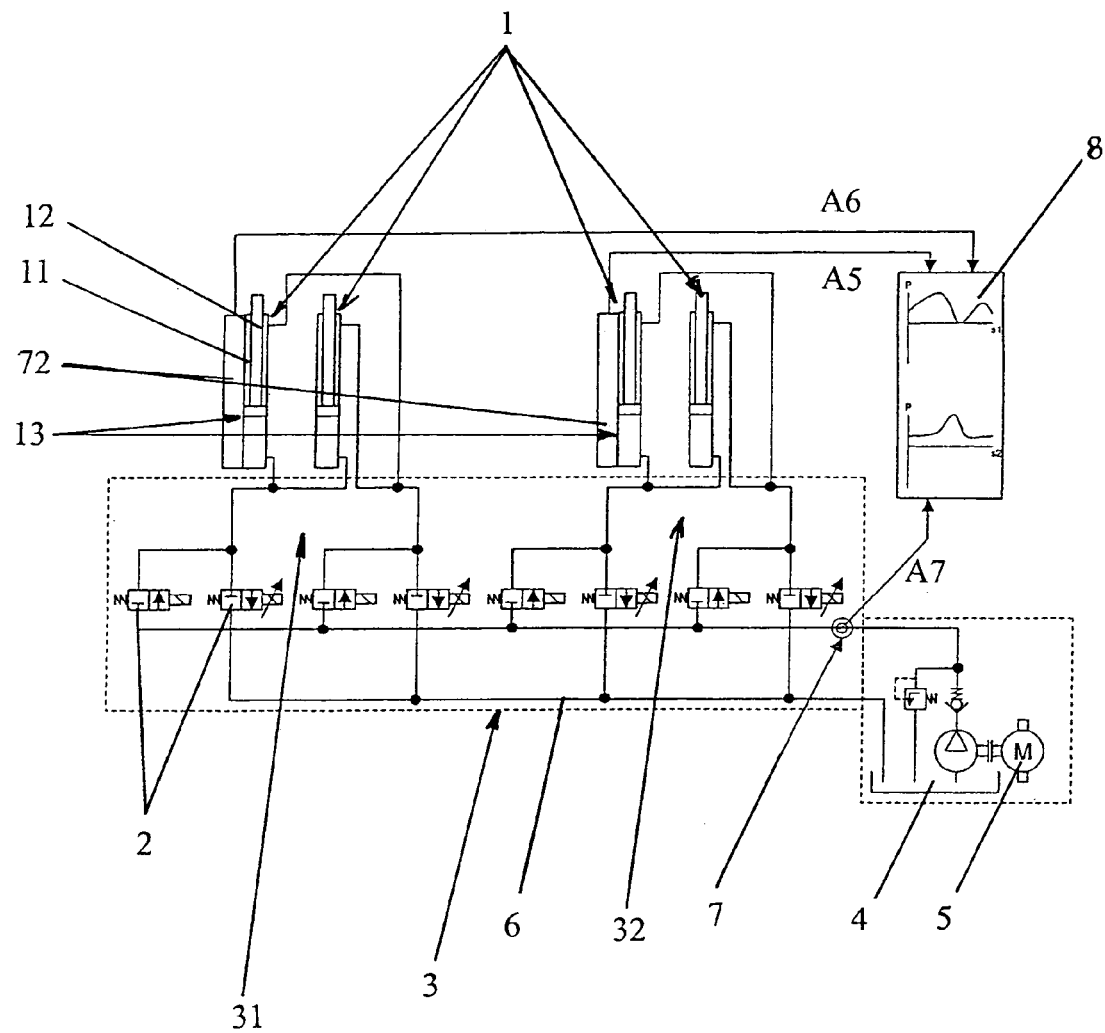
FIG. 2 is a circuit diagram of a second embodiment of the inventive load-controlled actuating arrangement.

The actuating arrangement represented in FIG. 2 is provided with four actuators 1, each consisting of a working cylinder 11 and a piston rod 12 (the component groups following the piston rod 12 are not shown). Two of these actuators 1 can be used, for example, for a motion of a convertible top and the other two actuators can be used, for example, for the motion of a convertible top cover (the motions of which are not herein depicted).

The working cylinders 11 are connected via separate control elements 2, that can be, for example, proportional valves, with a common pressure circuit 3 that is, for example, divided into two pressure subcircuits 31 (convertible top) and 32 (convertible top cover). The connection of the pressure circuit 3, including its connection to a pressure pump 4 located in the hydraulic tank 5, is performed by hydraulic lines 6. This component group that is surrounded by a dashed line in FIG. 2 is also designated as an aggregate or valve block.

The actuators 1 are equipped with position measuring systems 13 so that the position of the individual working cylinders 11 can be registered.

A position measuring system 13 switched into the pressure subcircuit 31 (convertible top) and a further positioning measuring system 13 switched into the pressure subcircuit 32 (convertible top cover) are connected with an external control unit 8 via terminals A5 and A6.

The terminals A5 and A6 transmit the two signals of the position measuring systems 13 switched into the pressure subcircuit 31 or into the pressure subcircuit 32 to the control unit 8.

The pressure circuit 3 comprises a pressure sensor 7 that is connected with the control unit 8 via a terminal A7. The terminal A7 transmits the signals of the turned on pressure sensor 7 to the control unit 8.

The control unit 8 includes a computer (not shown in FIG. 2) for monitoring and analyzing the individual pressure of the pressure circuit 3 and the corresponding position of the working cylinder 11. Said computer controls the control elements 2. The signal of the pressure sensor 7 as a function of time is matched with the signals of the position measuring systems 13 and is used to control the individual actuators 1.

A desired curve is used for matching the actual values. If the actual values deviate from the desired curve, the power of the pressure pump 4 will be adjusted and/or the flow of the hydraulic medium will be regulated via the control elements 2.

At the beginning of an actuating process, the piston rods 12 of the actuators 1 are adjusted inward and all the control elements 2 are currentless. If the pressure pump 4 is switched on, the control elements 2 will be brought into another position (not shown) that causes the piston rod 12 of the working cylinder 11 to extend.

The pressure in the pressure circuit 3, i.e., in the example in FIG. 2 in the pressure subcircuit 31 and in the pressure subcircuit 32, is determined by the pressure sensor 7 and processed in the computer of the control unit 8. Here, the actual pressure is compared as a function of time with the pressure known from the process.

The position of the working cylinders 11 are determined simultaneously by the position measuring system 13. This means that on the basis of the pressure as a function of time matched with the position data of the working cylinders 11 recorded by the position measuring systems 13, the control can identify whether the position of the piston rod 12 in the working cylinder 11 must be corrected from the actual value to the desired value.

The advantageous feature of the inventive actuating arrangement is the fact that a sudden increase of the load (deviation of the actual value from the desired value) is registered and the motion is corrected, interrupted or reversed. In this way, an always constant motion of the top is ensured under different external conditions, a strong impact in the corresponding final positions is avoided and (rough) collisions are detected.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention.

LIST OF REFERENCE NUMERALS

1—actuator
11—working cylinder
12—piston rod
13—position measuring system
2—control elements
3—pressure circuit
31—pressure subcircuit (convertible top)
32—pressure subcircuit (convertible top cover)
4—pressure pump
5—hydraulic tank
6—line
7—pressure sensor
72—path measuring system
73—angle measuring system, 8—control unit
9—electric motor
91—convertible top cinematic system
92—convertible top cover
A1; A2; A3; A4—terminals (electric motor control)
A5; A6; A7—terminals (hydraulic control)

The invention claimed is:

1. A load-controlled actuating arrangement for a convertible top, comprising:
   at least one position measuring system;
   a control unit; and
   at least one measuring system of an electric motor or at least one pressure sensor of a pressure circuit, signals of the measuring system of the electric motor or the pressure sensor being transmittable to the control unit, the motion of the convertible top being adjustable by the control unit, said at least one position measuring system, said control unit and said at least one measuring system of the electric motor or said at least one pressure sensor defining, at least in part, a control loop.

2. A load-controlled actuating arrangement according to claim 1, wherein said at least one position measuring system is an angle measuring system.

3. A load-controlled actuating arrangement according to claim 1, wherein said at least one measuring system of the electric motor or said at least one pressure sensor includes said at least one pressure sensor, said load-controlled actuating mechanism further comprising actuators that are connected with a pressure circuit via control elements connected with the control unit, said actuators being controllable and adjustable by the control elements.

4. A load-controlled actuating arrangement according to claim 3, wherein the control unit includes a computer for monitoring and analyzing the signals.

* * * * *